Figure 1:
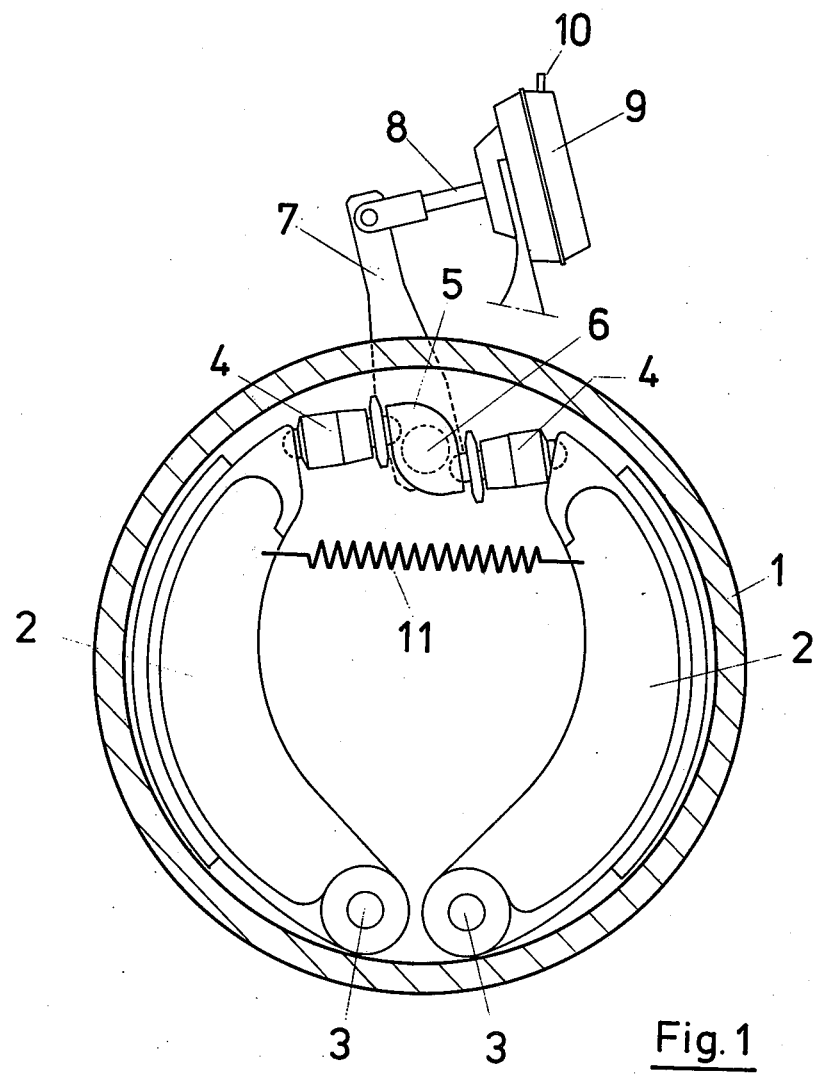

United States Patent [19]
Camph

[11] 3,891,068
[45] June 24, 1975

[54] AUTOMATIC SLACK ADJUSTER

[76] Inventor: Sven Erik Camph, Nya Agnesfridsvagen 186, S-213 75 Malmo, Sweden

[22] Filed: Apr. 2, 1974

[21] Appl. No.: 457,252

[30] Foreign Application Priority Data
Apr. 6, 1973  Sweden.............................. 7304863

[52] U.S. Cl................... 188/196 BA; 188/79.5 GE
[51] Int. Cl.......................................... F16d 65/56
[58] Field of Search... 188/79.5 K, 79.5 P, 79.5 GE, 188/79.5 GC, 79.5 GT, 196 B, 196 BA

[56]     References Cited
FOREIGN PATENTS OR APPLICATIONS
675,244   5/1929   France......................... 188/79.5 GE
354,268   1/1930   United Kingdom......... 188/79.5 GE Primary Examiner—Duane A. Reger
Attorney, Agent, or Firm—Laurence R. Brown

[57]            ABSTRACT

In a key operated drum brake a pair of adjusting means is arranged between each side of the key and one end of a brake shoe. The adjusting means are interconnected so as to move in unison and the movement is caused by a one-way clutch having an almost stationary element and an element following the key in one direction.

5 Claims, 4 Drawing Figures

AUTOMATIC SLACK ADJUSTER

This invention relates to an automatic slack adjuster for a brake of the type comprising two brake shoes which during activating of the brake are forced against the inside of a brake drum by means of a key mounted on a rotating key shaft, and in which a brake force transmitting slack take-up element is mounted between each side of the said key and a movable end of each brake shoe, said element comprising two telescopically displaceable parts interconnected by screw threads causing an increase in the length of the element upon relative rotation of said parts in one direction of rotation.

The rotation of the key shaft is normally effected by a compressed-air activated cylinder-piston unit pivotally connected to a lever mounted on the key shaft.

In order to obtain a fast brake application and thus a short stopping distance measured from the application of the brakes it is desired to design all brake force transmitting components as rigid as possible. Especially the elasticity of the brake drum and the brake shoes has been decreased substantially.

Automatic slack adjusters are devices which automatically adjust the length of the brake force transmission to compensate for the wear of the braking surfaces. It will be understood that an automatic slack adjuster will be easier to design to the desired specifications the more close it is mounted to the wearing parts in order to eliminate the disturbing influence any elasticity in the brake force transmission may have. Consequently it is an object of the present invention to design an automatic slack adjuster which may be mounted near the braking surfaces and which may be provided with a simple, cheap and reliable mechanism for operation.

According to the present invention this object is obtained thereby that one of said parts of each said element is connected to a common single clutch part of a one-way clutch comprising two clutch parts capable of performing relative angular movements in one direction in case of excessive movements of said key.

Figure 2:
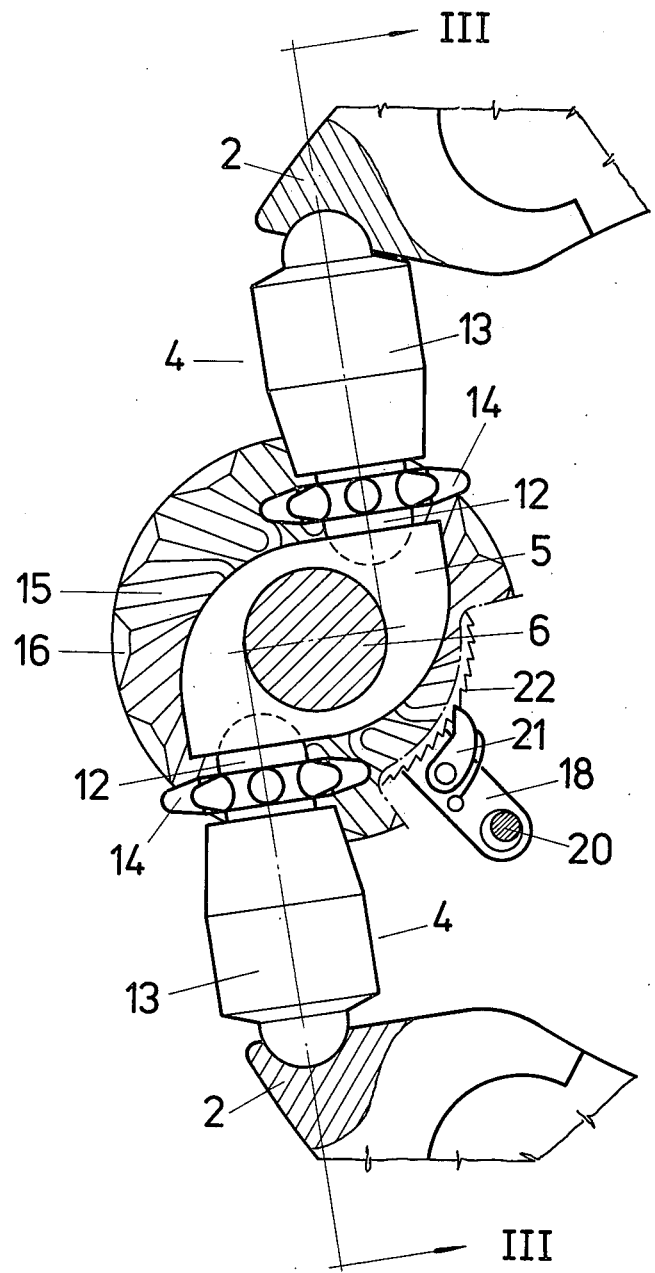
Figure 3:
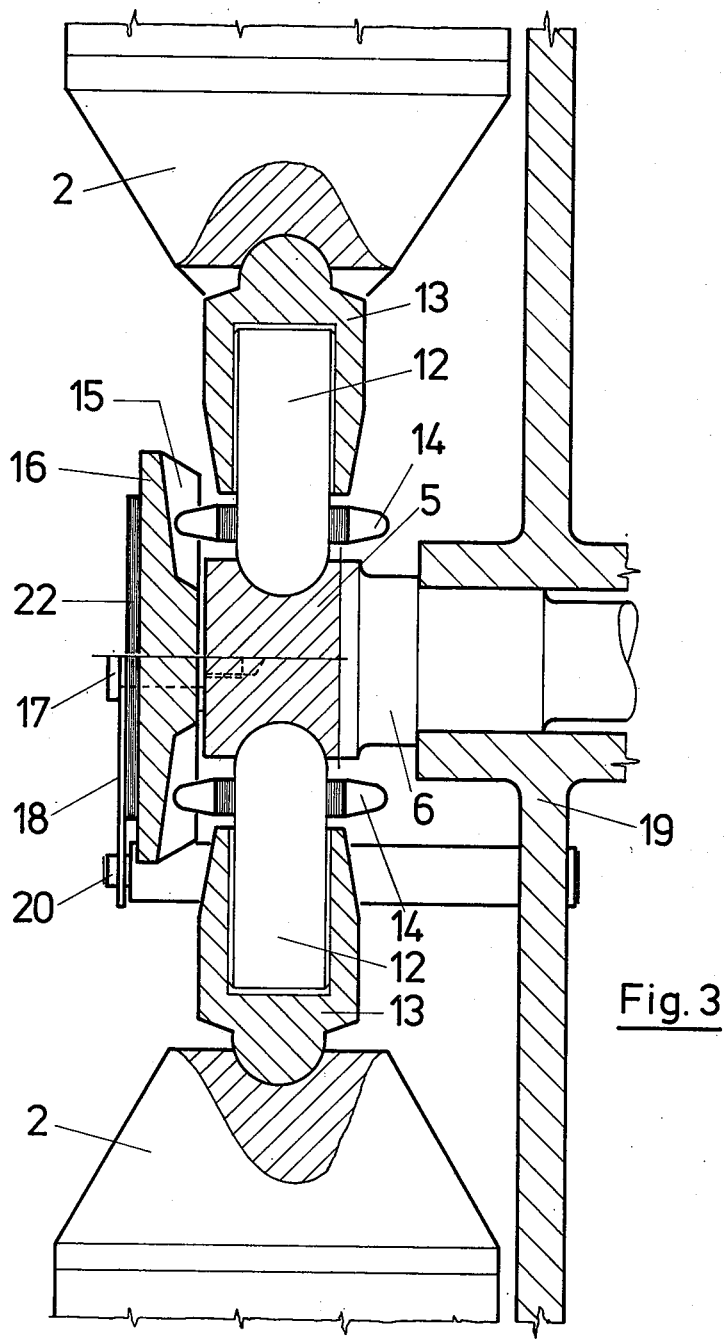
Figure 4:
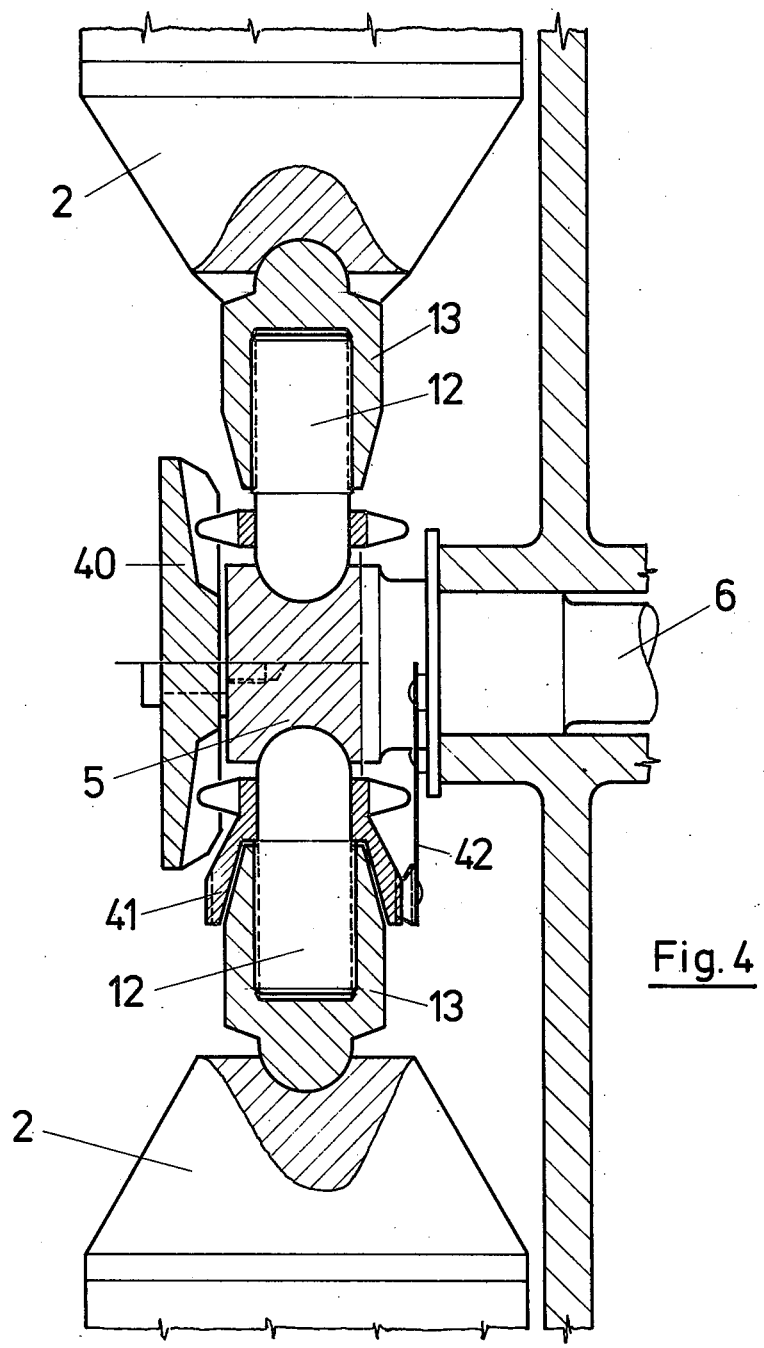

The invention will be described in more detail reference being made to the drawing in which FIG. 1 schematically shows the working principle of a conventional key operated brake, FIG. 2 shows a side view of a part of an adjuster according to the invention, FIG. 3 shows a section along the line III—III of FIG. 2, and;

FIG. 4 is a section corresponding to that of FIG. 3, but through a modified embodiment of the invention.

As shown in FIG. 1 a conventional brake may consist of a drum 1 mounted on a wheel (not shown) and being adapted to be engaged by a pair of brake shoes 2 pivotally connected at 3 to a backing plate (not shown in FIG. 1) which is stationary relative to the chassis of a vehicle. The ends of the braking shoes 2 remote from the pivots 3 are engaged by a pair of brake force transmitting elements 4 which in turn are engaging the sides of a key 5 mounted on a key shaft 6 which is activated by a lever 7 pivotally connected to the piston rod 8 of a cylinder-piston servo-motor 9 which may be supplied with compressed air via a pipe 10. It will be understood that by expelling the piston rod 8 and thus turning the key 5 the brake shoes 2 will be forced against the inside of the drum 1 to cause braking of the vehicle. A return spring 11 will cause a retraction of the brake shoes as soon as the force by the key 5 has ceased.

It will be understood that if the braking surfaces are worn, but the length of the elements 4 correspondingly increased, the working conditions for the key 5 and the brake force transmission between the key 5 and the cylinder-piston servo-motor 9 will remain unaffected.

FIGS. 2 and 3 show how the elements 4 could perform this automatic increase in length.

As seen in FIG. 2 the element 4 comprises two telescopically displaceable parts 12 and 13. The part 12 is provided with exterior threads (not shown) adapted to engage corresponding interior threads in the part 13 which is connected to the shoe 2 by means not allowing rotation of the part 13. The part 12 is allowed to rotate, but is provided with a number of angularly distributed teeth 14 at least one of which is protruding into one of a number of spirally shaped grooves 15 in a first disc shaped clutch part 16 journalled on the key shaft 6 by a bolt 17 as seen in FIG. 3. A second clutch disc 18 is journalled on the bolt 17, but this second clutch disc 18 is kept almost stationary relative to a stationary backing plate 19 by a pin 20 extending into a somewhat larger opening in the said second clutch disc 18.

The second clutch disc 18 carries a spring actuated pawl 21 adapted to engage a toothed circular path 22 on the first clutch disc 16. The connection between the first clutch disc 16 and the second clutch disc 18 is so that torque may only be transmitted between them in such direction as may cause a rotation of the element 14 in the slack take-up direction.

The device described will operate as follows:

Upon application of the brake the key shaft 6 and the key 5 are turned and will wedge the brake shoes 2 outwardly. The turning of the key 5 will cause the tooth (or the teeth) 14 engaging the grooves 15 to move outwardly in said grooves. The pawl 21 will interconnect the two clutch discs 16 and 18 and thus the part 18 will participate in the turning of the shaft 6. However, after a predetermined angular movement corresponding to the lost motion between the pin 20 and the hole in the part 18 the pin 20 will prevent further movement of the second part 18. Upon further turning of the first clutch part 16 the pawl 21 will allow a relative rotation of the two parts 16 and 18 i.e. the part 16 will rotate and the part 18 will remain stationary. Such relative rotation will only be caused in case of a turning of the key 5 which exceeds that of the part 18 allowed by the pin 20. The normal slack in the brake rigging does not allow such excessive turning of the key 5.

However, whenever the turning of shaft 16 exceeds one tooth length on surface 22, which occurs in case of excessive slack in the rigging, the above described relative movement of the two clutch parts 16 and 18 will take place during the brake application and the movement of part 16 causes the pawl 21 to engage a new tooth on surface 22. During the following release of the brake the two clutch parts 16 and 18 are not allowed to rotate relative each other. At first the slack between the pin 20 and the hole in the part 18 into which it protrudes is exhausted during a common rotation of the two clutch parts in the direction opposite to that performed during the brake application. Then the two clutch parts 16 and 18 will remain stationary, but the key 5 is still turning and the return spring 11 is still causing the elements 4 to move towards the central part of the clutch part 16 to the extent necessary to overcome the effect of the rotation of part 16 by an additional tooth distance as caused by the operation of pawl 21.

This will cause the part 12 to rotate relative to the part 13 and increase the length of the element 4. Such increase will continue at the end of each brake release operation until normal slack in the rigging has been restored.

It is well known in the art of adjusting slack automatically that in some cases it is desired to carry out the slack adjustment during the return stroke of the brake (as described above). However, alternatively it may be desired to perform the slack adjustment during the brake application. This could be obtained by a few modifications of the device shown. The threads connecting the parts 12 and 13 should have a pitch of opposite hand as the one in the shown embodiment. Also the pawl 21 should lock in the opposite direction of relative rotation and finally the pin 20 should be resilient so as to limit the force transmitted during the adjustment motion. This embodiment has not been illustrated because of its small deviations from the embodiment of FIGS. 2 and 3.

As shown in FIG. 4 the two parts 12 need not both be directly connected to the activating one-way clutch. In FIG. 4 the two parts 12 are interconnected by a gear wheel 40 of the same shape as the part 16 previously described. One of the parts 12 is provided with a gear wheel 41 adapted to be engaged by a resiliently mounted latch 42 connected to the key shaft 6. Angular movements of the key shaft 6 in one direction will cause the latch 42 to slide on one or more teeth of the gear wheel 41. Angular movements of the shaft 6 in the other direction will cause a rotation of the parts 12.

What is claimed is:

1. An automatic slack adjuster for a brake of the type comprising two brake shoes which during activating of the brake are forced against the inside of a brake drum by means of a key mounted on a rotating key shaft, and in which a brake force transmitting slack take-up element is mounted between each side of the said key and a movable end of each brake shoe, said element comprising two telescopically displaceable parts interconnected by screw threads causing an increase in the length of the element upon relative rotation of said parts in one direction of rotation, characterised in that one of said parts of each said element is connected to a common single clutch part of a one-way clutch comprising two clutch parts capable of performing relative angular movements in one direction in case of excessive movements of said key, characterised in that rotatable parts of the take-up elements are engaging the sides of the said key and that parts of the take-up elements prevented from rotation are engaging the ends of the brake shoes, the said common single clutch part being journalled on the key shaft.

2. A slack adjuster as claimed in claim 1, characterised in that another clutch part of said one-way clutch is connected to a stationary part of the brake through a lost motion connection, but is journalled on said key shaft so as to be able to follow the angular movements of said first clutch part only through a limited angle.

3. A slack adjuster as claimed in claim 2, characterised in that said one-way clutch is adapted to transmit torque between the clutch parts only during the release movement of the key shaft, such torque causing a slack take-up by said elements.

4. A slack adjuster as claimed in claim 1, characterised in that the rotatable parts of said slack take-up elements are interconnected by a gear wheel journalled on the key shaft, and that only one of the rotatable parts is directly influenced by a one-way clutch comprising angularly spaced teeth on the rotatable part and a resiliently mounted latch connected to the key shaft.

5. A slack adjuster as claimed in claim 2, characterised in that said one-way clutch is adapted to transmit torque between the clutch parts only during the brake application movement of the key shaft, such torque transmission causing a slack take-up by said parts, means being provided for limiting the torque transmitted by said clutch.

* * * * *